(12) United States Patent
Dikshit et al.

(10) Patent No.: US 12,192,086 B2
(45) Date of Patent: Jan. 7, 2025

(54) VALIDATING REACHABILITY FOR LIAISON VRFS USING OAM PING PACKETS

(71) Applicant: HEWLETT PACKARD ENTERPRISE DEVELOPMENT LP, Houston, TX (US)

(72) Inventors: Saumya Dikshit, Bangalore (IN); Ashwini Dahiya, Bangalore (IN); Srinath Krishna Rao, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 365 days.

(21) Appl. No.: 17/728,395

(22) Filed: Apr. 25, 2022

(65) Prior Publication Data

US 2023/0344736 A1 Oct. 26, 2023

(51) Int. Cl.
*H04L 43/10* (2022.01)
*H04L 12/46* (2006.01)
*H04L 45/02* (2022.01)

(52) U.S. Cl.
CPC .......... *H04L 43/10* (2013.01); *H04L 12/4633* (2013.01); *H04L 12/4641* (2013.01); *H04L 45/02* (2013.01)

(58) Field of Classification Search
CPC . H04L 43/10; H04L 12/4633; H04L 12/4641; H04L 45/02; H04L 43/0811; H04L 43/20
See application file for complete search history.

(56) References Cited

U.S. PATENT DOCUMENTS

| | | | | |
|---|---|---|---|---|
| 7,623,446 | B1 * | 11/2009 | Allan | H04L 45/04 370/405 |
| 7,983,174 | B1 * | 7/2011 | Monaghan | H04L 45/50 370/242 |
| 9,071,514 | B1 * | 6/2015 | Hegde | H04L 45/28 |
| 11,159,389 | B1 * | 10/2021 | Miriyala | H04L 41/142 |
| 2015/0029872 | A1 * | 1/2015 | Pignataro | H04L 45/24 370/252 |

(Continued)

OTHER PUBLICATIONS

"Layer-transcending traceroute for VXLAN", available online at <https://datatracker.ietf.org/meeting/92/materials/slides-92-nvo3-5>, 12 pages.

(Continued)

*Primary Examiner* — Benjamin M Thieu
(74) *Attorney, Agent, or Firm* — Sheppard Mullin Richter & Hampton LLP

(57) ABSTRACT

Systems and methods provide a new type of time-length-value data stream (TLV) which can be encapsulated in an OAM ping packet. This "EVI TLV" encapsulating OAM ping packet can be sent to a network device (e.g., a border router) that a liaison VRF is provisioned on. Upon receipt, the encapsulated EVI TLV instructs the network device to determine whether the configuration of the liaison VRF is mapped to an EVI value specified by the EVI TLV. If the configuration of the liaison VRF is mapped to the specified EVI value, the network device returns an echo response indicating that the configuration of the liaison VRF is mapped onto the specified EVI value. Such a response may indicate that the liaison VRF is reachable for the EVPN.

20 Claims, 6 Drawing Sheets

EVPN FABRIC 110

CONTROL PLANE 112

DATA PLANE 114

(56) References Cited

U.S. PATENT DOCUMENTS

2021/0203585 A1* 7/2021 Takeshita ............... H04L 43/12

OTHER PUBLICATIONS

Chen et al., "Revised Error Handling for BGP Update Messages", Request for Comments: 7606, Aug. 2015, 19 pages.
Jain et al., "LSP-Ping Mechanisms for EVPN and PBB-EVPN draft-ietf-bess-evpn-lsp-ping-06", Jan. 16, 2022, 16 pages.
Jain et al., "LSP-Ping Mechanisms for EVPN and PBB-EVPN draft-ietf-bess-evpn-lsp-ping-05", BESS Workgroup, Jun. 14, 2021, 15 pages.
Juniper Networks, Inc., "MPLS OAM Configuration," Feb. 22, 2021, 21 pages, <https://web.archive.org/web/20211028002751/https://www.juniper.net/documentation/us/en/software/junos/mpls/topics/topic-map/mpls-oam-configuration.html>.
Kompella et al., "Detecting Multi-Protocol Label Switched (MPLS) Data Plane Failures", Request for Comments: 4379, Feb. 2006, 50 pages.
Kompella et al., "Detecting Multiprotocol Label Switched (MPLS) Data-Plane Failures", Request for Comments: 8029, Mar. 2017, 78 pages.
Lukas Krattiger, "Overlay Management and Visibility with VXLAN", Cisco, 2019, 101 pages.
Salam et al., "NVO3 Fault Management draft-tissa-nvo3-oam-fm-04.txt", NV03 Working Group, May 5, 2017, 39 pages.

* cited by examiner

VALIDATING REACHABILITY FOR LIAISON VRFS USING OAM PING PACKETS

BACKGROUND

Operations, Administration, and Maintenance (OAM) technologies can provide a troubleshooting infrastructure to monitor network health. Existing OAM technologies enable troubleshooting (i.e. validating configurations and reachability) of network devices within Ethernet Virtual Private Networks (EVPNs) by encapsulating various types of type-length-value data streams (TLVs) in OAM ping packets. These encapsulated TLVs generally contain information that can be used by a receiving network device to validate its configuration and reachability.

A liaison Virtual Routing and Forwarding Instance (VRF), typically provisioned on a border router of an EVPN, leaks routes between the EVPN and external networks. In other words, the liaison VRF acts as a liaison between external networks and the EVPN by publishing learned external routes to internal EVPN devices (e.g., Virtual Tunnel Endpoints (VTEPs)). This internal publishing forms tunnels between the liaison VRF and the other EVPN devices which can be used by an OAM ping mechanism to reach the liaison VRF.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
FIG. 1 is an example conceptual diagram depicting an example EVPN fabric, in accordance with various examples of the presently disclosed technology.

The figures are not exhaustive and do not limit the present disclosure to the precise form disclosed.

DETAILED DESCRIPTION

As described above, a liaison VRF acts as a liaison between external networks and an EVPN by publishing learned external routes to internal EVPN devices (e.g. Vteps). This internal publishing forms tunnels between the liaison VRF and the other EVPN devices which can be used by an OAM ping mechanism to reach the liaison VRF. However, when an EVPN is newly provisioned, communication with external networks may not commence immediately. Accordingly, the liaison VRF may not have external routes to publish, and thus may not have formed tunnels with other EVPN devices.

In this scenario, existing OAM ping mechanisms which rely on overlay tunnels to reach a liaison VRF cannot be utilized to validate the liaison VRF. Because IP addresses are generally not configured onto liaison VRFs, other common TLVs/OAM ping mechanisms (which utilize IP addresses to perform reachability checks) cannot be used to reach the liaison VRF either. Accordingly, a network administrator who wants to validate the reachability of a liaison VRF while provisioning a new EVPN cannot use existing TLVs/OAM ping mechanisms.

To address this problem, examples of the presently disclosed technology provide a new type of TLV (i.e. an EVPN Instance Identifier (EVI) TLV) which can be encapsulated in an OAM ping packet. This EVI TLV OAM ping packet can be sent to a network device (e.g., a border router) that a liaison VRF is provisioned on (unlike the liaison VRF, the border router will have an IP address, and thus can be reached using current OAM ping mechanisms). Upon receipt, the encapsulated EVI TLV instructs the network device to determine whether the configuration of the liaison VRF is mapped to an EVI value specified by the EVI TLV. If the configuration of the liaison VRF is mapped to the specified EVI value, the network device returns an echo response indicating that the configuration of the liaison VRF is mapped onto the specified EVI value. Such a response indicates that the liaison VRF is reachable for the EVPN (as described above, the EVPN is identified by the EVI value). In other words, if a liaison VRF is mapped to the EVI value, that means that the liaison VRF is enabled for publishing/receiving/hosting routes within the EVPN.

By leveraging typical mapping of a liaison VRF to an EVI value for an EVPN (e.g., a Virtual Network Identifier (VNI) for Vxlan EVPN fabrics, or an MPLS label for MPLS EVPN fabrics), examples of the presently disclosed technology can perform OAM ping validations on liaison VRFs before the liaison VRF has formed tunnels with other EVPN devices. Existing OAM ping technologies cannot do this. As examples of the presently disclosed technology appreciate, being able to perform OAM ping validations on liaison VRFs before they have formed tunnels with other EVPN devices can be advantageous when provisioning new EVPNs. In other words, it can be advantageous for a network administrator to validate a liaison VRF when provisioning an EVPN to ensure that the liaison VRF is properly configured and reachable before the EVPN is up and running. Examples perform this validation via modified OAM ping mechanisms because OAM pings validate both control plane (i.e., configuration of the liaison VRF) and data plane (i.e., reachability of the liaison VRF). Other validation checks, such as manually logging into the border router on which a liaison VRF is provisioned, may only validate the control plane.

FIG. 1 is an example conceptual diagram depicting an example EVPN fabric 110, in accordance with various examples of the presently disclosed technology.

EVPN fabric 110 comprises a control plane 112 and a data plane 114.

Control plane 112 may be a conceptual plane of EVPN fabric 110 that controls how data packets are forwarded within EVPN fabric 110. In other words, control plane 110 may comprise the functions and processes involved for determining data packet routes within EVPN fabric 110. Control plane 112 may use various protocols to determine data packet routes. Examples of these protocols may include MP-BGP, BGP-EVPN, BGP-L3VPN, etc. As described above, a control plane validation of a liaison VRF may comprise validating the configuration of the liaison VRF.

Data plane 114 may be a conceptual plane of EVPN fabric 110 that actually forwards data packets. In other words, data plane 114 may comprise the functions and processes that actually route data packets within EVPN fabric 110 (for basic analogy, if control plane 112 is the brain of EVPN 110, data plane 114 is the hands and feet). Data plane 114 may utilize various protocols to route packets within EVPN fabric 110. For example, if EVPN fabric 110 is a Vxlan fabric, data plane 114 may utilize Vxlan-based protocols. By the same token, if EVPN fabric 110 is an MPLS fabric, data plane may utilize MPLS-based protocols. As described above, a data plane validation of a liaison VRF may comprise validating the reachability of the liaison VRF OAM ping mechanisms are well-suited for troubleshooting a network device/component like a liaison VRF because they can perform both a control plane and a data plane validation at the same time.

Data Plane Validation: OAM pings can be sent as echo request datagrams (i.e., OAM ping packets) over the same routes as a data packet would be sent. Accordingly, by reaching a liaison VRF and returning an echo response, an OAM ping can validate the data plane for an EVPN visa-vie the liaison VRF. In other words, the OAM ping validates the reachability of the liaison VRF.

Control Plane Validation: An OAM ping may perform a control plane validation for a liaison VRF as well. In other words, the OAM ping may validate the configuration of the liaison VRF and confirm that it is operational within the EVPN (i.e., enabled for publishing/hosting/receiving routes to and from other nodes of the EVPN). As alluded to above, the OAM ping may achieve these validations/confirmations by encapsulating TLVs within an OAM ping packet. These encapsulated TLVs may instruct the network device on which the liaison VRF is provisioned to validate the configuration of the VRF and/or confirm that the liaison VRF is operational/reachable.

Figure 2:
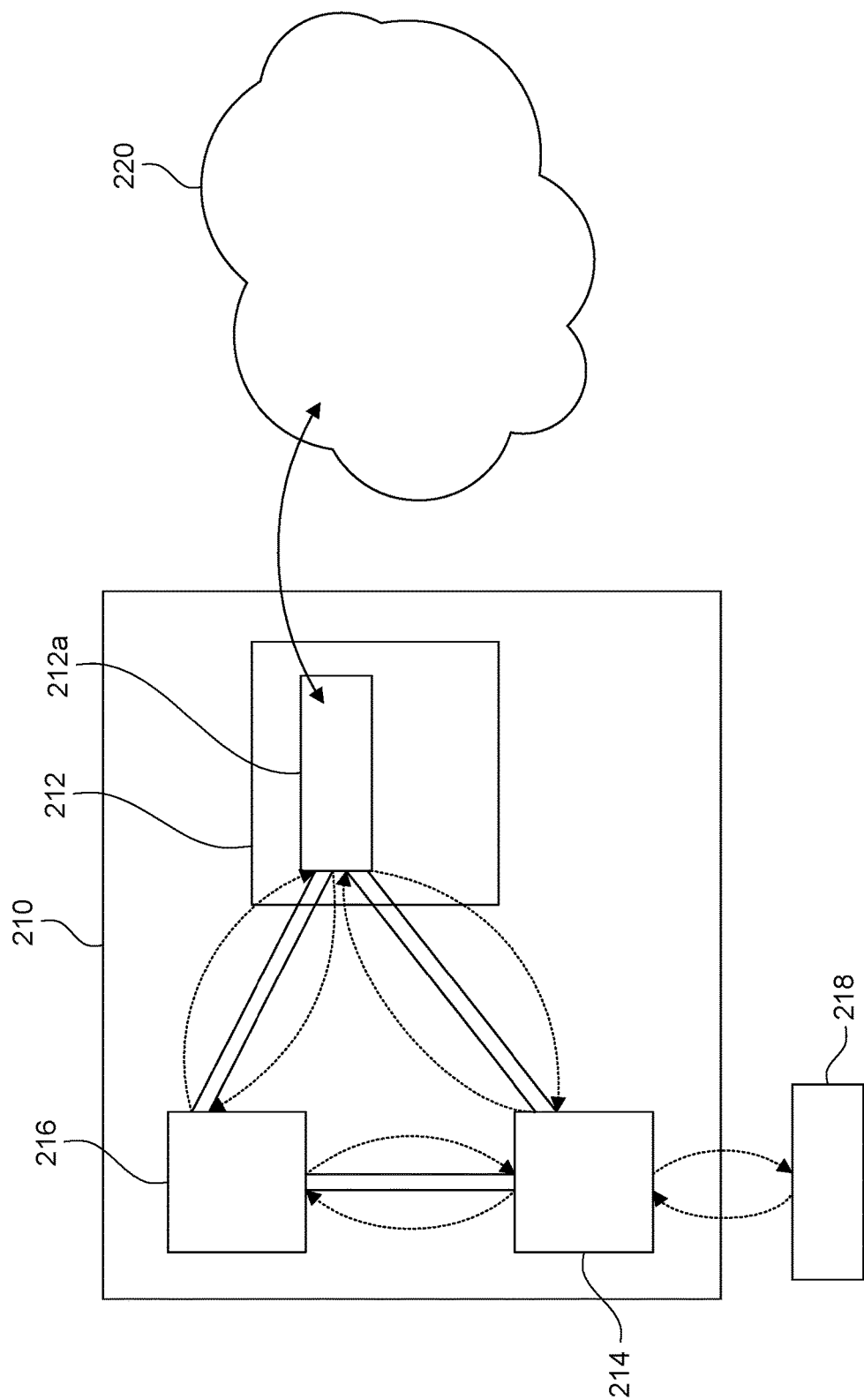
FIG. 2 is an example diagram depicting an example EVPN fabric, in accordance with various examples of the presently disclosed technology.

FIG. 2 is an example diagram depicting an example EVPN fabric 210, in accordance with various examples of the presently disclosed technology.

EVPN fabric 210 may be any type of EVPN fabric (e.g., MPLS, Vxlan, Mac-in-Mac, etc.). As depicted, EVPN fabric 210 contains network devices 214 and 216 and border router 212. In various examples, EVPN fabric 210 may include a different number of network devices.

Network devices 214 and 216 may be various types of network devices (e.g., switches, routers, gateways, etc.). If EVPN fabric 210 comprises a Vxlan fabric, network devices 214 and 216 may comprise Vxlan Tunnel Endpoints (Vteps). These Vteps may be hardware-based or software-based.

Border router 212 may be a router deployed at the edge of EVPN fabric 210. Provisioned on border router 212 is liaison VRF 212a (in various examples, border router 212 may provision non-liaison VRFs as well). Liaison VRF 212a may be a virtual routing and forwarding instance. As described above, liaison VRF 212a may act as a "liaison" between EVPN fabric 210 and other networks (e.g., external networks 220) by publishing learned external routes to internal EVPN devices (e.g., network devices 214 and 216). In various examples, liaison VRF 212a may be the sole VRF in EVPN fabric 210 responsible for storing/publishing learned external routes.

As depicted, EVPN fabric 210 communicates with external networks 220 (here external networks 220 may comprise one or more networks external to EVPN fabric 210). In its role as "liaison," liaison VRF 212a may publish routes learned from external networks 220 to other network devices within EVPN fabric 210. To publish these external routes, liaison VRF 212a may form virtual overlay (i.e., layer 2) tunnels with other network devices. Accordingly, in the example of FIG. 2, liaison VRF 212a has formed overlay tunnels to network devices 214 and 216 respectively.

Via these overlay tunnels, data packets may be routed/forwarded within EVPN fabric 210. As will be described below, to validate the data plane of EVPN fabric 210, OAM management device 218 may send OAM ping packets over the tunnels/overlay network of EVPN fabric 210.

OAM management device 218 may be a device (hardware or software) which generates OAM ping packets. As depicted, OAM management device 218 is external to EVPN fabric 210. However, in various examples OAM management device 218 may be a device within EVPN fabric 210.

As described above, utilizing existing OAM ping mechanisms, OAM management device 218 may send an OAM ping packet to validate a network device (e.g., network devices 214 and 216, or border router 212) using an IP address of the network device. Liaison VRFs such as liaison VRF 212a typically lack IP addresses (in other words, because of their limited "liaison" roles, liaison VRFs are not typically provisioned with layer 3 interfaces). Thus, in order to "reach" liaison VRF 212a using existing OAM ping mechanisms, OAM management device 218 must utilize the overlay tunnel network of EVPN fabric 210. In this way, OAM management device 218 may validate the data plane of EVPN fabric 210 visa-a-vie liaison VRF 212a.

In the example of FIG. 2, OAM management device 218 can send OAM ping packets to liaison VRF 212a because liaison VRF 212a has formed tunnels with other network devices within EVPN fabric 210. In other words, because liaison VRF 212a is a connected node within the overlay tunnel network of EVPN fabric 210, OAM pings sent via this overlay tunnel network may reach liaison VRF 212a (here OAM ping packets may be sent to e.g., network device 214 initially as network device 214 has an IP address/layer 3 interface).

However, it may not always be the case that a liaison VRF is a connected node of a tunnel network overlaying an EVPN fabric. For example, a newly provisioned EVPN may not have commenced communication with external networks. Accordingly, the liaison VRF of the EVPN may not have published learned external routes internally, and by extension, may not have formed overlay tunnels with other network devices within the EVPN. Accordingly, OAM ping packets sent via the overlay tunnel network of the EVPN will not reach the liaison VRF. This scenario will be described further in conjunction with FIG. 3.

Figure 3:
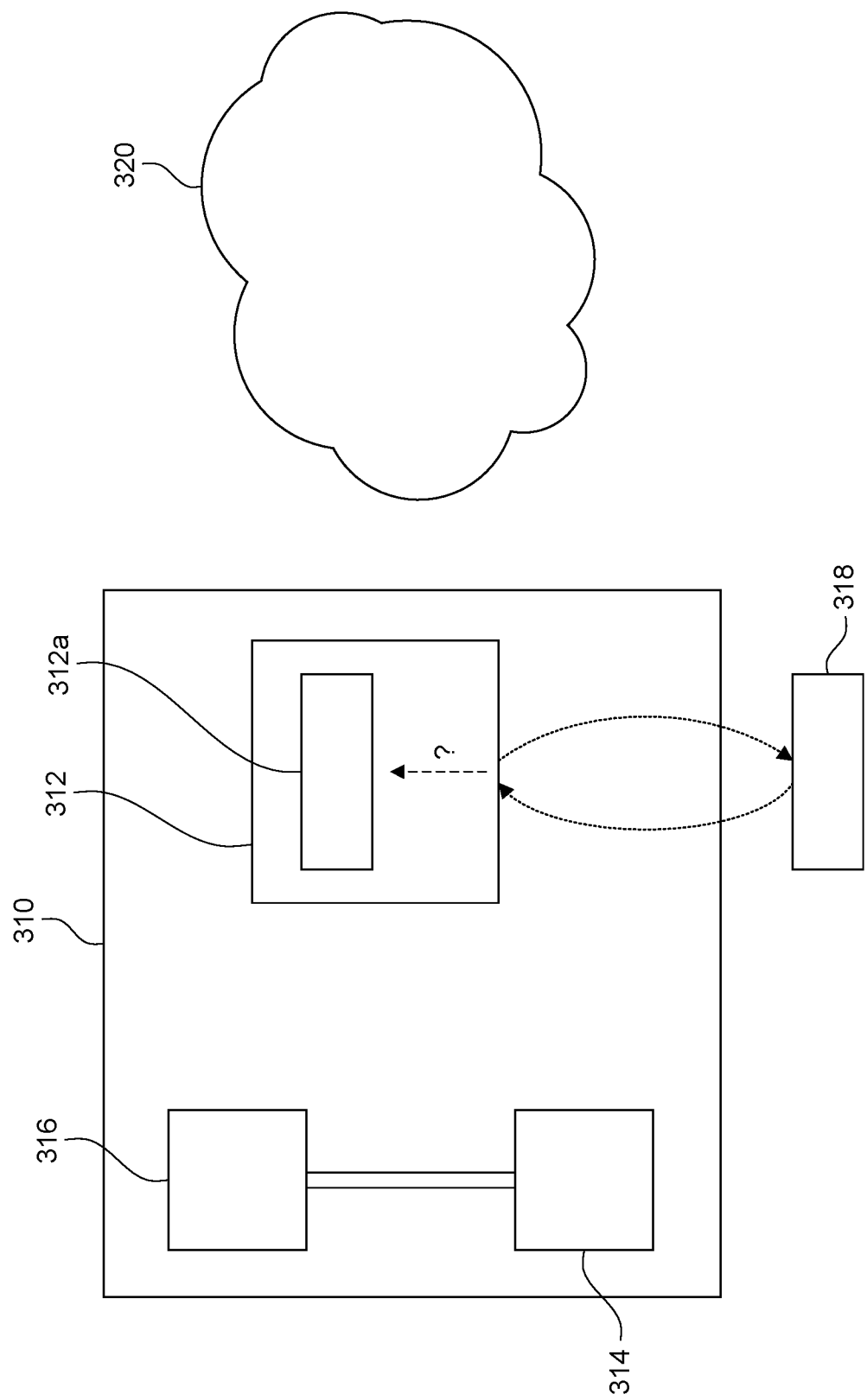
FIG. 3 is another example diagram depicting an example EVPN fabric, in accordance with various examples of the presently disclosed technology.

FIG. 3 is an example diagram depicting an example EVPN fabric 310, in accordance with various examples of the presently disclosed technology. As depicted, EVPN fabric 310 contains network devices 314 and 316 and border router 312. Provisioned on border router 312 is liaison VRF 312a. Here, EVPN fabric 310 and its constituent components may be defined similarly to their corresponding components described in conjunction with FIG. 2.

A key distinction between FIG. 2 and FIG. 3 is that in FIG. 3, liaison VRF 312a has not formed overlay tunnels with other network devices within EVPN fabric 310. As described above, this may be because EVPN fabric 310 is being provisioned (or has only recently been provisioned), and thus has not commenced communication with external networks 320.

Because liaison VRF 312a has not formed tunnels with other network devices (e.g., network devices 314 and 316), OAM management device 318 cannot utilize the overlay tunnel network of EVPN fabric 310 to reach/ping liaison VRF 312a. Moreover, because liaison VRF 312a lacks an IP address/layer 3 interface, OAM management device 318 cannot utilize other existing OAM ping mechanisms to validate liaison VRF 312a.

To address this problem, examples of the presently disclosed technology provide a new type-length-value data stream (TLV) which can be encapsulated by existing OAM ping mechanisms to validate a liaison VRF when the liaison VRF cannot be reached via a EVPN's overlay tunnel network. In particular, examples provide an EVPN Instance Identifier (EVI) TLV such as the example EVI TLV depicted below.

```
 0                   1                   2                   3                   4
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |         EVI Identifier        |
+-+-+-+-+-+-+-+-+-+-+-+-+-+-+-+-+-+-+-+-+-+-+-+-+-+-+-+-+-+-+-+-+
|                     EVI Identifier (continued)                |
+-+-+-+-+-+-+-+-+-+-+-+-+-+-+-+-+-+-+-+-+-+-+-+-+-+-+-+-+-+-+-+-+
```

As depicted, the EVI TLV may comprise a type field, a length field, and a value field (i.e. the EVI Identifier field).

The type field of the EVI TLV may comprise one octet and may describe the type/kind of message being conveyed by the EVI TLV, and may depend on the type of EVPN fabric.

The length field of the EVI TLV may define the length of the value field. For example, if the EVI Identifier in the value field comprises four octets, the corresponding length field may carry "4" as the length.

The value field of the EVI TLV may comprise an EVI identifier value. This EVI identifier value may vary depending on EVPN fabric 310's type. For example, if EVPN fabric 310 is a Vxlan fabric, the EVI identifier value may comprise a Virtual Network Identifier (VNI) value for EVPN 310. By contrast, if EVPN fabric 310 is an MPLS-based fabric, the EVI identifier value may comprise an MPLS label for EVPN fabric 310.

As examples of the presently disclosed technology appreciate, while a liaison VRF may not have an IP address/layer 3 interface, the liaison VRF will often be mapped to the EVI identifier for an EVPN. This is because the liaison VRF must be mapped to the EVI identifier in order to publish routes within the EVPN. Accordingly, examples of the presently disclosed technology may validate the configuration and reachability of a liaison VRF by confirming that it is mapped to the EVI identifier for an EVPN.

In particular, OAM management device 318 can send an OAM ping packet to border router 312 which encapsulates an EVI TLV such as the one illustrated above. This OAM ping command may utilize the IP address of border router 312 (e.g., 101.1.1.1) to reach border router 312. An example OAM ping packet command designed to validate whether liaison VRF 312a is mapped to example EVI identifier 100 is illustrated below.

Aruba-cx-vtysh## Path trace 101.1.1.1 100 [Command Syntax: Pathtrace <border router 312 IP><EVI>]

Upon receiving such an OAM ping packet, border router 312 may determine whether a configuration of liaison VRF 312a is mapped onto EVI identifier 100. If border router 312 determines that the configuration of liaison VRF 312a is mapped onto EVI identifier 100, border router 312 may respond with an echo response indicating as such. If border router 312 determines that the configuration of liaison VRF 312a is not mapped onto EVI identifier 100, border router 312 may drop the OAM ping packet, or provide an echo response with an error message.

When OAM management device 318 receives an echo response indicating that liaison VRF 312a is mapped onto EVI identifier 100, OAM management device may confirm that liaison VRF 312a is properly configured and reachable. In other words, OAM management device may confirm that liaison VRF 312a is up and working.

By contrast, if OAM management device 318 does not receive an echo response or receives an echo response indicating that liaison VRF 312a is not mapped onto EVI identifier 100, OAM management device 318 may confirm that liaison VRF 312a is not reachable and/or not properly configured. In other words, OAM management device 318 may confirm that liaison VRF 312a is not up and working. As described above, such information can be valuable to a network administrator when provisioning an EVPN such as EVPN fabric 310.

Figure 4:
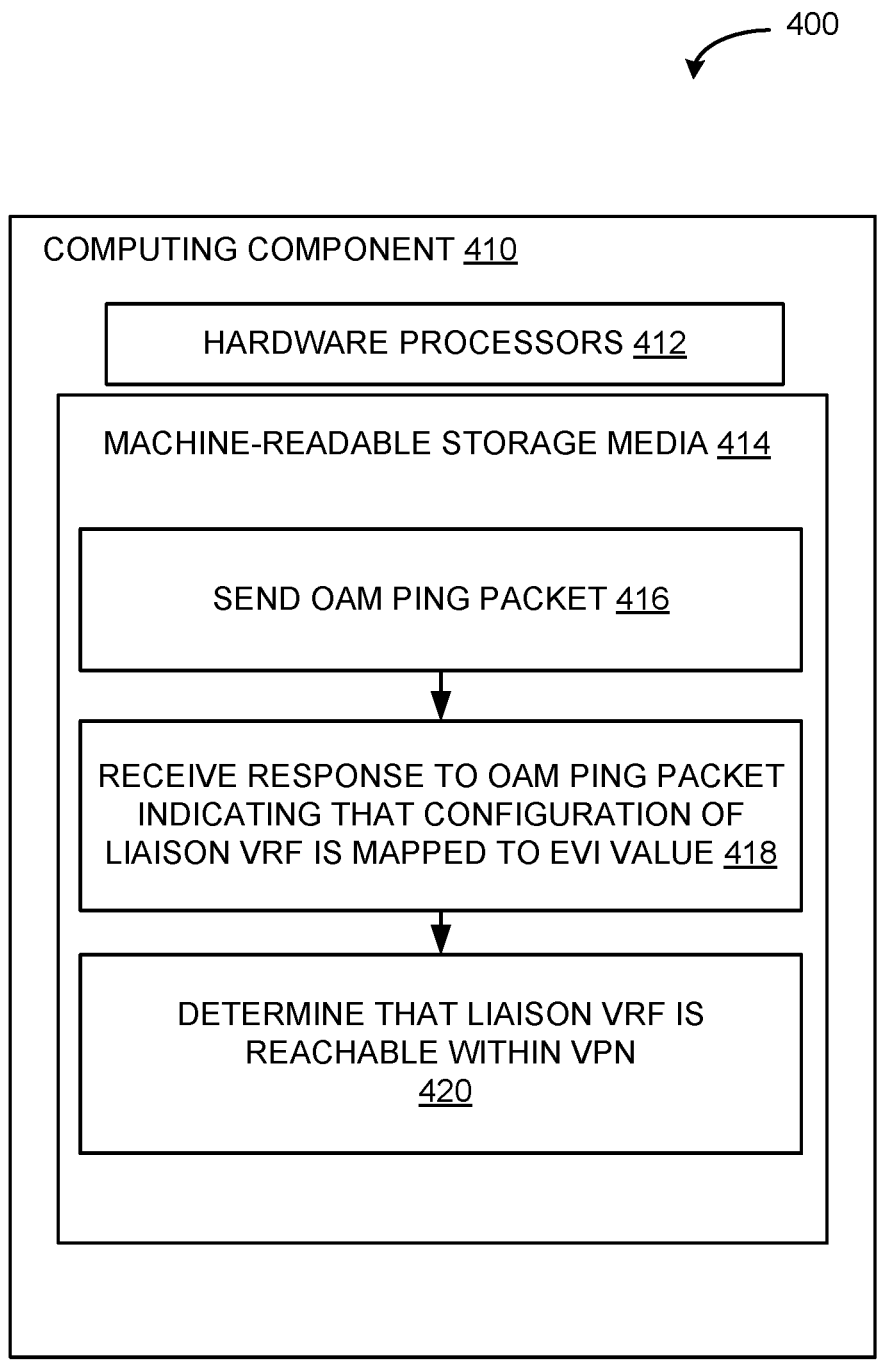
FIG. 4 depicts an example computing system that may be used to validate the configuration and reachability of a liaison VRF in a VPN, in accordance with various examples.

FIG. 4 depicts an example computing system 400 that may be used to validate the configuration and reachability of a liaison VRF in a VPN, in accordance with various examples. Referring now to FIG. 4, computing component 410 may be, for example, a server computer, a controller, or any other similar computing component capable of processing data. In the example implementation of FIG. 4, the computing component 410 includes a hardware processor 412, and machine-readable storage medium for 414. In various examples, example computing system 400 may be implemented on a device in the VPN.

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 416-420, to control processes or operations for burst preloading for available bandwidth estimation. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 414 may be a non-transitory storage medium, where the term "non-transitory" does not encompass transitory propagating signals. As described in detail below, machine-readable storage medium 414 may be encoded with executable instructions, for example, instructions 416-420.

As described above, computing system 400 may be used to validate the configuration and reachability of a liaison VRF in a VPN. Accordingly, hardware processor 412 may execute instruction 416 to send to an OAM ping packet to a device in the VPN. Here, the liaison VRF may be provisioned on the device. In certain examples, the device may comprise a border device such as a border router, border switch, border gateway, etc. In various examples, the VPN may be an EVPN.

The liaison VRF may function to publish learned external routes to other devices within the VPN (these "other devices within the VPN" may comprise various types of devices, both hardware-based and software-based). In other words, the liaison VRF may act as a liaison between external networks and devices within the VPN. In its role as liaison, the liaison VRF may store learned external routes, and publish them to other devices within the VPN. In doing so, the liaison VRF may form overlay tunnels with other devices within the VPN. However, as described above, in some instances the liaison VRF may not have published any routes to other devices within the VPN. This may be the case where the VPN is newly provisioned, and has not yet commenced communication with external networks. In these scenarios, the liaison VRF may not have formed overlay tunnels with other devices within the VPN. Accordingly, the liaison VRF may be unreachable using existing OAM ping mechanisms.

To address this scenario, hardware processor 412 may encapsulate a VPN instance identifier (EVI) time-length-value data stream (TLV) (collectively an EVI TLV) in the OAM ping packet sent to the device (as described above, hardware processor 412 may be able to send the OAM ping packet to the device because unlike the liaison VRF, the device may have an IP address). As described above, this EVI TLV may specify an EVI value identifying the VPN. Where the VPN comprises a Vxlan data plane, the EVI value may by a VNI associated with the Vxlan data plane. When the VPN comprises an MPLS-based data plane, the EVI value may comprise an identifying label associated with the MPLS-based data plane.

As described above, upon receipt of the OAM ping packet encapsulating the EVI TLV, the device may determine whether a configuration of the liaison VRF is mapped to the EVI value specified in the EVI TLV. If the device determines that the configuration of the liaison VRF is mapped to the EVI value specified in the EVI TLV, the device may send an echo response indicating as such.

Accordingly, hardware processor 412 may execute instruction 418 to receive, from the device, a response to the OAM packet indicating that the configuration of the liaison VRF is mapped to the EVI value specified in the EVI TLV.

Hardware processor 412 may execute instruction 420 to determine that the liaison VRF is reachable within the VPN. As described above, hardware processor 412 may determine that the liaison VRF is reachable within the VPN simply by receiving the echo response indicating that the configuration of the liaison VRF is mapped to the EVI value specified in the EVI TLV.

Figure 5:
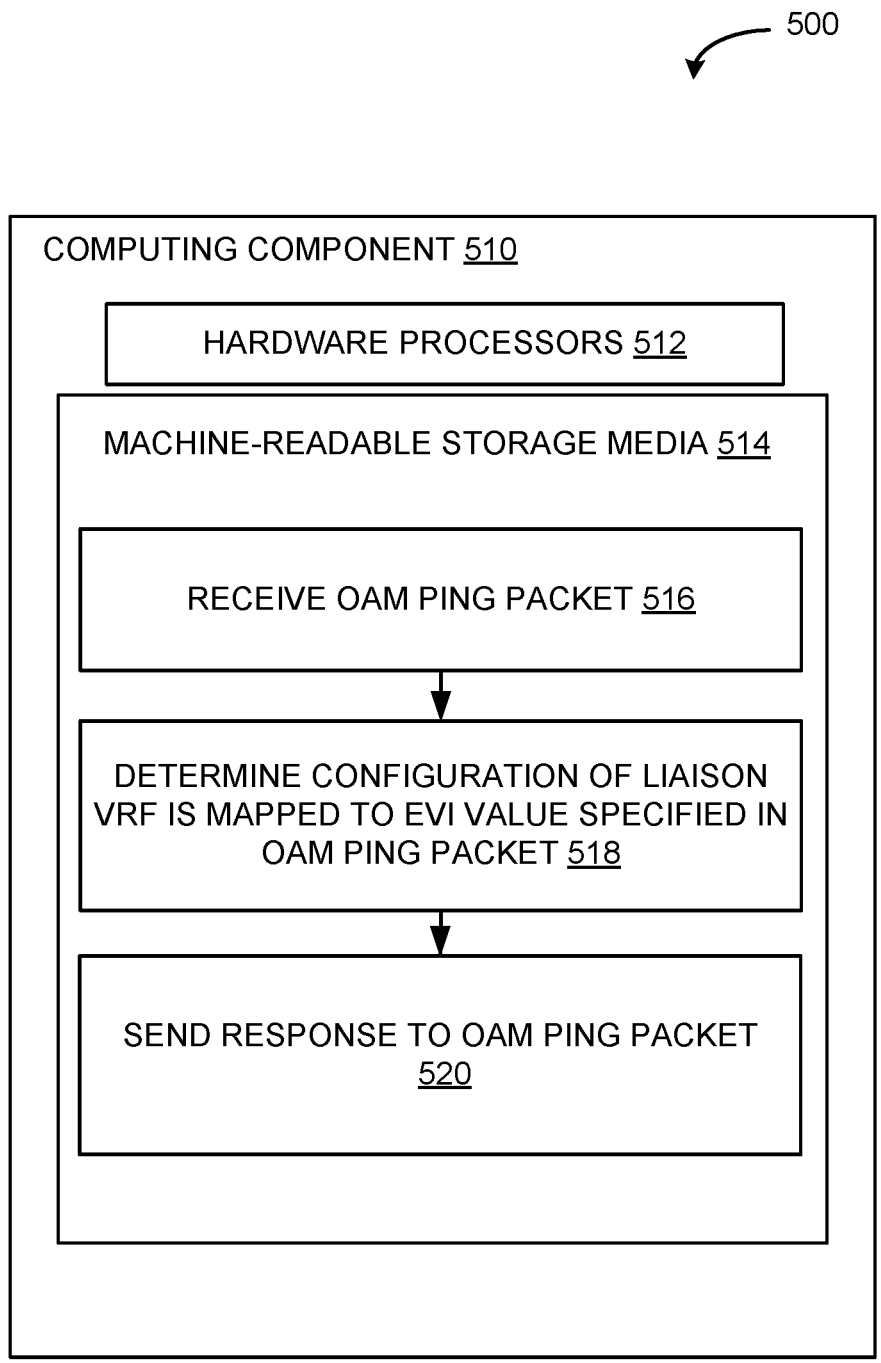
FIG. 5 depicts another example computing system that may be used to validate the configuration and reachability of a liaison VRF in a VPN, in accordance with various examples.

FIG. 5 depicts another example computing system 500 that may be used to validate the configuration and reachability of a liaison VRF in an EVPN, in accordance with various examples. Referring now to FIG. 5, computing component 510 may be, for example, a server computer, a controller, or any other similar computing component capable of processing data. In the example implementation of FIG. 5, the computing component 510 includes a hardware processor 512, and machine-readable storage medium for 514. Here, computing system 500 is implemented on a first device within the EVPN. The liaison VRF is provisioned on this first device.

Hardware processor 512 and machine-readable storage medium 514 may be the same/similar as hardware processor 412 and machine-readable storage medium 414 respectively. Accordingly, machine-readable storage medium 514 may be encoded with executable instructions, for example, instructions 516-520.

Hardware processor 512 may execute instruction 516 to receive an OAM ping packet. As described in conjunction with FIG. 4, the OAM ping packet may encapsulate an EVI TLV. This EVI TLV may specify an EVI value associated with the EVPN. The EVI TLV and EVI value may be the same/similar as described in conjunction with FIG. 4.

As described above, hardware processor 512 is implemented on a first device within the EVPN. The liaison VRF is provisioned on this first device (here the liaison VRF may be the same/similar as described in conjunction with FIG. 4). In various examples, the first device may be a border device of the EVPN, such as a border router, a border switch, a border gateway, etc.

In various example, hardware processor 512 may receive the OAM ping packet from a second device within the EVPN. This second device may be hardware-based or software-based. The second device may send the OAM ping packet to the first device using any of the methods described in conjunction with the previous figures.

Hardware processor 512 may execute instruction 518 to determine that a configuration of the liaison VRF is mapped onto the EVI value specified in the EVI TLV. As described above, this may indicate that the liaison VRF is reachable within the EVPN. In other words, this may indicate that the liaison VRF is enabled for publishing/receiving/hosting routes within the EVPN.

Hardware processor 512 may execute instruction 518 to send a response to the OAM ping packet indicating that the configuration of the liaison VRF is mapped to the EVI value specified in the EVI TLV. In certain examples, this response may comprise an echo response to the OAM ping packet. The response may be received by the second device (i.e., the device which initially sent the OAM ping packet to the first device). In various examples, the response to the OAM ping packet may also indicate that the liaison VRF is reachable within the EVPN.

Figure 6:
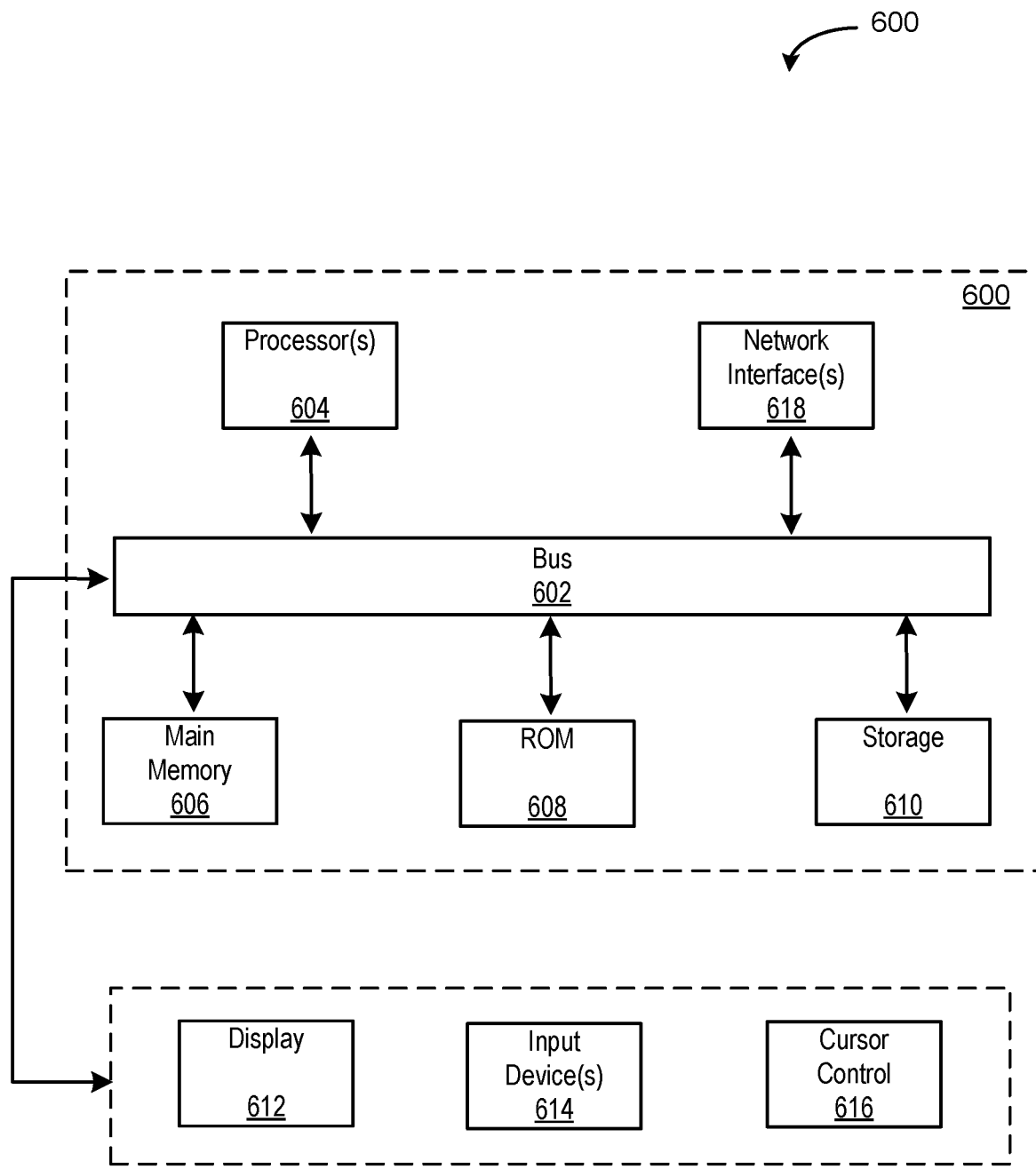
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

A network link typically provides data communication through one or more networks to other data devices. For example, a network link may provide a connection through local network to an edge computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network, and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method comprising:
    sending, by a first device, to a second device in a Virtual Private Network (VPN), an Operations, Administration, and Maintenance (OAM) ping packet, wherein;
        a liaison Virtual Routing and Forwarding instance (VRF) is provisioned on the second device,
        the liaison VRF functions to publish learned external routes to other devices within the VPN,
        the OAM ping packet encapsulates a VPN Instance Identifier (EVI) time-length-value data stream (TLV) (collectively an EVI TLV), and
        the EVI TLV specifies an EVI value; and
    receiving, by the first device, from the second device, a response to the OAM ping packet indicating that a configuration of the liaison VRF is mapped onto the specified EVI value.

2. The method of claim 1, further comprising, determining, by the first device, that the liaison VRF is reachable within the VPN.

3. The method of claim 1, wherein the liaison VRF has not published any learned external routes to the other devices within the VPN.

4. The method of claim 1, wherein the VPN comprises an Ethernet VPN (EVPN).

5. The method of claim 4, wherein the EVPN comprises a Vxlan data plane and the EVI value comprises a Virtual Network Identifier (VNI) associated with the Vxlan data plane.

6. The method of claim 4, wherein the EVPN comprises an MPLS data plane and the EVI value comprises an identifying label associated with the MPLS data plane.

7. The method of claim 4, wherein the second device comprises a border router of the EVPN.

8. The method of claim 1, wherein the first device is a device within the VPN.

9. A first device in an EVPN, the first network device comprising:
    a plurality of processing resources associated with the first device; and
    a non-transitory computer-readable medium, coupled to the plurality of processing resources, having stored therein instructions that when executed by the processing resources cause the first device to:

receive, from a second device, an OAM ping packet, wherein;
    a liaison VRF is provisioned on the first device,
    the liaison VRF functions to publish learned external routes to other devices within the EVPN,
    the OAM ping packet encapsulates an EVI TLV, and
    the EVI TLV specifies an EVI value;
determine that a configuration of the liaison VRF is mapped onto the specified EVI value; and
send, to the second device, a response to the OAM ping packet indicating that the configuration of the liaison VRF is mapped onto the specified EVI value.

10. The first device of claim 9, wherein the response to the OAM ping packet comprises an echo response.

11. The first device of claim 9, wherein the response to the OAM ping packet also indicates that the liaison VRF is reachable within the EVPN.

12. The first device of claim 9, wherein the first device comprises a border router of the EVPN.

13. The first device of claim 9, wherein the liaison VRF has not published any learned external routes to the other devices within the EVPN.

14. The first device of claim 9, wherein the EVPN comprises a Vxlan data plane and the EVI value comprises a VNI associated with the Vxlan data plane.

15. The first device of claim 9, wherein the EVPN comprises an MPLS data plane and the EVI value comprises an identifying label associated with the MPLS data plane.

16. The first device of claim 9, wherein the second device is a device within the EVPN.

17. A non-transitory computer-readable medium storing instructions, which when executed by a plurality of processing resources of a first device, cause the first device to:
    send, to a second device in an EVPN, an OAM ping packet, wherein;
        a liaison VRF is provisioned on the second device,
        the liaison VRF functions to publish learned external routes to other devices within the EVPN,
        the OAM ping packet encapsulates an EVI TLV, and
        the EVI TLV specifies an EVI value;
    receive, from the second device, a response to the OAM ping packet indicating that a configuration of the liaison VRF is mapped onto the specified EVI value; and
    determining the liaison VRF is reachable within the EVPN.

18. The non-transitory computer-readable medium of claim 17, wherein the liaison VRF has not published any learned external routes to other devices within the EVPN.

19. The non-transitory computer-readable medium of claim 17, wherein EVPN comprises a Vxlan data plane and the EVI value comprises a VNI associated with the Vxlan data plane.

20. The non-transitory computer-readable medium of claim 17, wherein the EVPN comprises an MPLS data plane and the EVI value comprises an identifying label associated with the MPLS data plane.

* * * * *